United States Patent
Azar Cohen et al.

(10) Patent No.: US 10,194,224 B2
(45) Date of Patent: Jan. 29, 2019

(54) POOL FLOAT WITH BUILT IN SPEAKERS AND POWER SOURCE

(71) Applicants: Leon Azar Cohen, Brooklyn, NY (US); Peter Ragonetti, Brooklyn, NY (US)

(72) Inventors: Leon Azar Cohen, Brooklyn, NY (US); Peter Ragonetti, Brooklyn, NY (US)

(*) Notice: Subject to any disclaimer, the term of this patent is extended or adjusted under 35 U.S.C. 154(b) by 0 days.

(21) Appl. No.: 15/246,939

(22) Filed: Aug. 25, 2016

(65) Prior Publication Data
US 2018/0063613 A1 Mar. 1, 2018

(51) Int. Cl.
| | | |
|---|---|---|
| *H04R 1/02* | (2006.01) | |
| *B63C 9/08* | (2006.01) | |
| *B63B 35/73* | (2006.01) | |
| *A47C 15/00* | (2006.01) | |
| *G06F 3/16* | (2006.01) | |
| *H04R 1/44* | (2006.01) | |
| *A47C 7/72* | (2006.01) | |
| *H04R 5/02* | (2006.01) | |
| *H04R 31/00* | (2006.01) | |

(52) U.S. Cl.
CPC .............. *H04R 1/028* (2013.01); *A47C 7/72* (2013.01); *A47C 15/006* (2013.01); *B63B 35/73* (2013.01); *B63C 9/08* (2013.01); *G06F 3/165* (2013.01); *H04R 1/44* (2013.01); *H04R 5/023* (2013.01); *H04R 31/006* (2013.01); *H04R 2420/07* (2013.01)

(58) Field of Classification Search
CPC ......... B63B 35/74; B63B 35/72; B63B 35/73; B63C 9/08; B63C 9/04; H04B 1/06; H04R 1/028; H04R 1/44; A47C 15/006; G06F 3/165

USPC .......................... 441/130, 128, 129, 131, 132
See application file for complete search history.

(56) References Cited

U.S. PATENT DOCUMENTS

| | | | | |
|---|---|---|---|---|
| 2,958,769 A | * | 11/1960 | Bounds | A47G 9/1045 381/347 |
| 4,856,087 A | * | 8/1989 | Nesbit | H04B 1/08 455/344 |
| 5,369,796 A | * | 11/1994 | Kung | H04B 1/08 455/344 |
| 8,366,502 B2 | * | 2/2013 | Lin | B63B 35/73 441/129 |

\* cited by examiner

*Primary Examiner* — Lars A Olson
(74) *Attorney, Agent, or Firm* — Ezra Sutton

(57) ABSTRACT

The present invention provides an inflatable device that floats on water having an inflatable body for flotation; and a built-in speaker unit being secured in a first compartment in the body. In addition, the first compartment and the speaker may be in the headrest, or armrest, or in a removable pillow. Further, the battery box is secured in a second compartment in the body, wherein the battery is rechargeable and the speaker unit is connected to the battery as a power source, or to a solar power source. The present invention also provides a flotation device that floats on water having a foam body for flotation; and a built-in speaker unit being secured in a first compartment in the body. In addition, the first compartment and the speaker may be in the headrest, or armrest, or in a removable pillow. Further, the battery box is secured in a second compartment in the body, wherein the battery is rechargeable and the speaker unit is connected to the battery as a power source, or to a solar power source.

15 Claims, 8 Drawing Sheets

POOL FLOAT WITH BUILT IN SPEAKERS AND POWER SOURCE

FIELD OF THE INVENTION

The present invention is in the field of pool floats, wherein the pool float has one or more built-in speakers, and a built in power source having a battery compartment, or a solar power compartment.

BACKGROUND OF THE INVENTION

Many pool floats are currently on the market having different features to accommodate the users. However, none of the existing pool floats have the structure and/or function of the present invention. Accordingly, the present invention provides novel structure and/or functions, which do not exist in the prior art.

DESCRIPTION OF THE PRIOR ART

Prior art U.S. Pat. No. 8,366,502 discloses a pool float having an inflatable body, a speaker unit secured to the body, a battery box removably secured to the body, and wiring that electrically connects the speaker unit with the battery box.

However, the structure and function of the present invention is distinguishable from the '502 patent because it does not use electrical wiring as used in the '502 patent.

OBJECTS OF THE INVENTION

It is an object of the present invention to provide an improved flotation device, which includes convenience structure for the user, including one or more built-in speakers.

Another object of the present invention is to provide an improved flotation device, which includes convenience structure for the user, including a headrest, or an armrest, or a removable pillow, having one or more built-in speakers contained therein.

Another object of the present invention is to provide an improved flotation device, which includes convenience structure for the user, wherein the built-in speakers are powered by solar power, instead of batteries.

Another object of the present invention is to provide an improved flotation device, which includes convenience structure for the user, wherein the flotation device includes foam for flotation, instead of being an inflatable body.

SUMMARY OF THE INVENTION

The present invention provides an inflatable device that floats on water having an inflatable body for flotation; and a built-in speaker unit being secured in a first compartment in the body. In addition, the first compartment and the speaker may be in the headrest, or armrest, or in a removable pillow. Further, the battery box is secured in a second compartment in the body, wherein the battery is rechargeable and the speaker unit is connected to the battery as a power source, or to a solar power source.

The present invention also provides a flotation device that floats on water having a foam body for flotation; and a built-in speaker unit being secured in a first compartment in the body. In addition, the first compartment and the speaker may be in the headrest, or armrest, or in a removable pillow. Further, the battery box is secured in a second compartment in the body, wherein the battery is rechargeable and the speaker unit is connected to the battery as a power source, or to a solar power source.

DETAILED DESCRIPTION OF THE PREFERRED EMBODIMENTS

Figure 1:
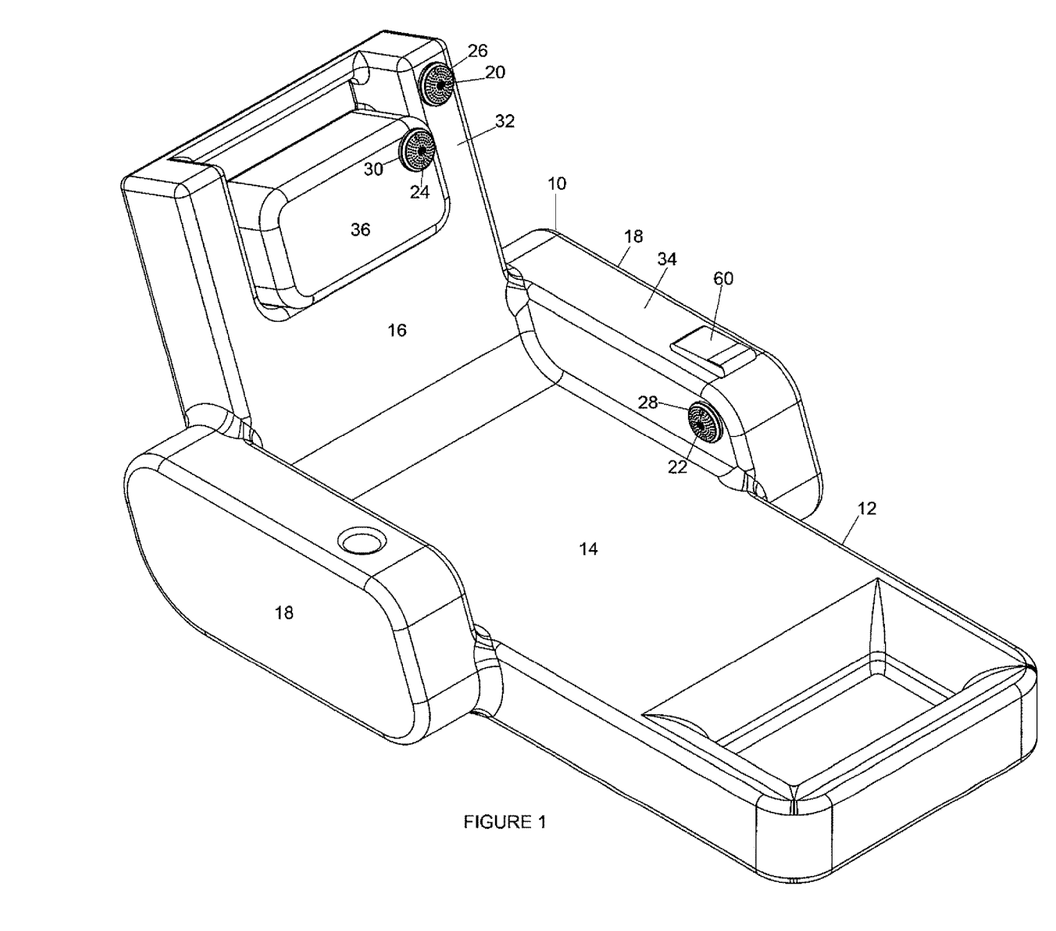
FIG. 1 is a perspective view of the pool float of the present invention.

As shown in FIG. 1, the present invention provides an inflatable device 10 that floats on water having an inflatable body 12 for flotation, including a seating section 14, an upright section 16, and side sections 18. Multiple speaker units 20, 22, and 24 are built into separate compartments 26, 28, and 30 of the body 12; wherein the separate compartments 26, 28, and 30 are in the headrest 32, or armrest 34, or in a removable pillow 36.

Figures 1A, 1B:
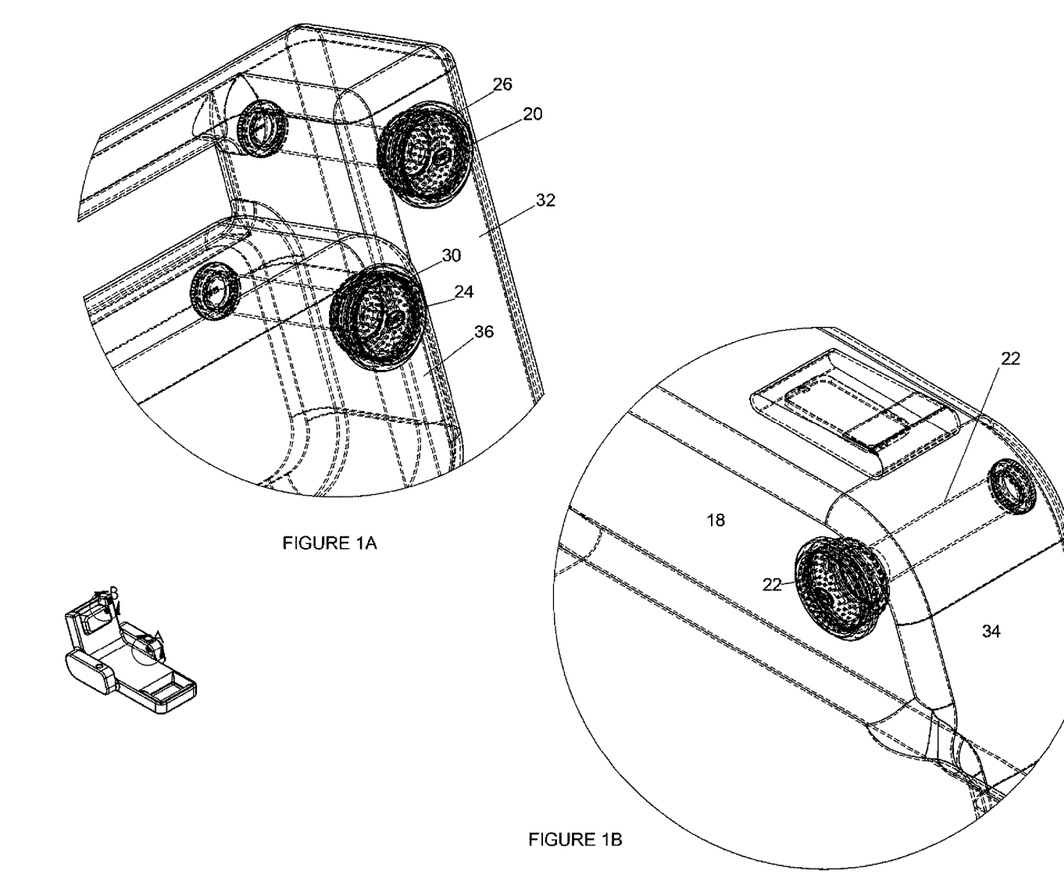
FIG. 1A is a detailed view showing built-in speakers in the removable pillow and in the headrest.
FIG. 1B is a detailed view showing a built-in speaker in the armrest.
Figure 1C:
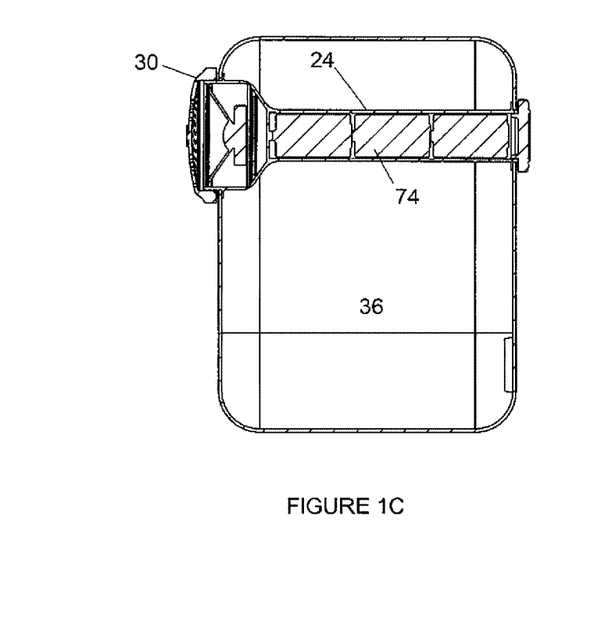
FIG. 1C is a cross-sectional view of the built-in speaker having a battery compartment in the pillow.
Figure 1D:
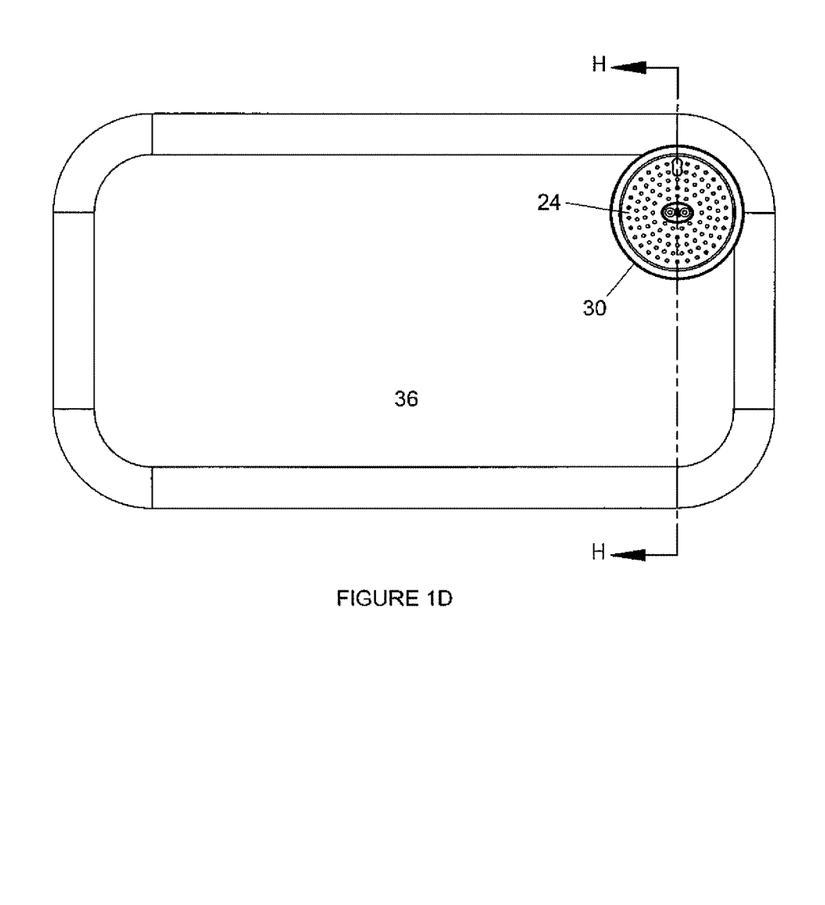
FIG. 1D is a detailed view showing the battery compartment in FIG. 1.

FIG. 1A is a detailed view showing the speaker 20 in the headrest 32, and also shows speaker 24 in the removable pillow 36. FIG. 1B is detailed view showing speaker 22 in the armrest 34. In addition, FIG. 1C is a cross-section view of the built-in speaker 24 in the removable pillow 36, and FIG. 1D is detailed view of the speaker 24 in the battery compartment 30.

Figures 2, 2A, 2B, 3, 4:
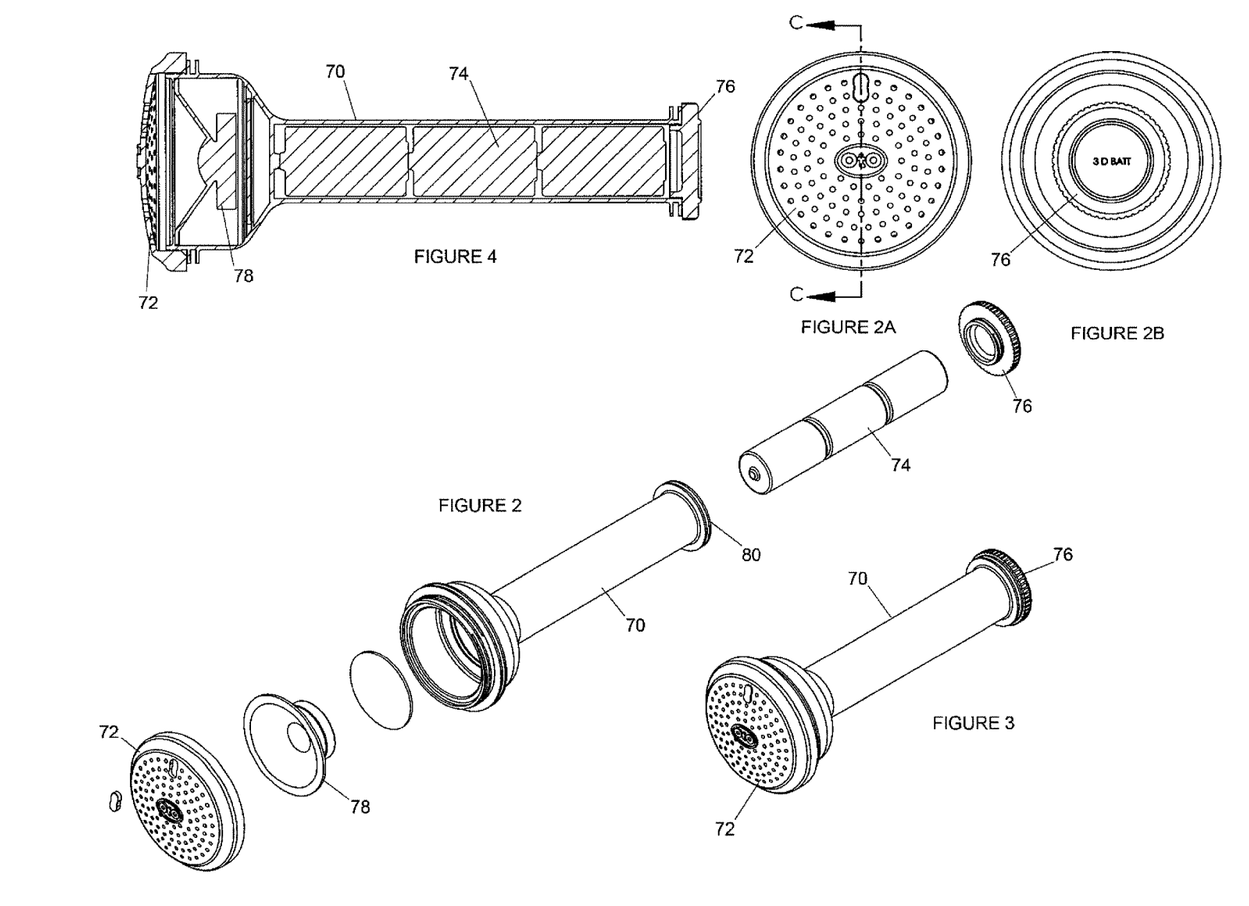
FIG. 2 is an exploded perspective view of the built-in speaker shown in FIGS. 1 and 1D.
FIG. 2A is an end view of the speaker.
FIG. 2B is the other end view of the speaker housing.
FIG. 3 is an assembled view of the built-in speaker
FIG. 4 is a cross-sectional view of the built-in speaker showing the batteries.

As shown in FIGS. 2, 3, and 4, there is a battery compartment 70 for housing the batteries 74 which are rechargeable and the speaker unit 78 is connected to batteries 74 as a power source. Alternatively, the speaker unit 78 may be solar powered using a solar cell 50, as discussed below. In addition, a cell phone pocket 60 is provided for holding a cell phone.

FIG. 2 shows an exploded view in detail of the housing compartment 70, a speaker grill 72, batteries 74, a speaker 78, the backing of the housing 80, and the end cap 76. FIG. 2A shows one end of the speaker housing 70, and FIG. 2B shows the other end of the speaker housing 70. Also, FIG. 3 shows a perspective view of the assembled built-in speaker.

Figure 5:
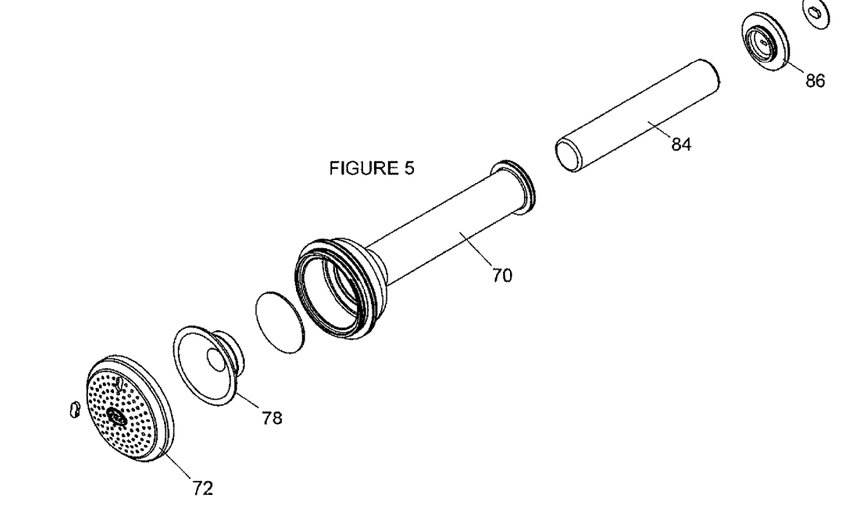
FIG. 5 is an exploded perspective view of the built-in speaker having a lithium battery.
Figure 5A:
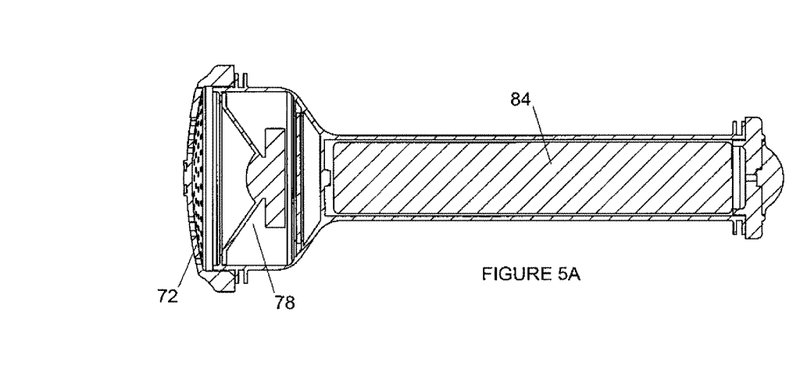
FIG. 5A is a cross-sectional view of the built-in speaker showing the battery compartment.
Figure 5B:
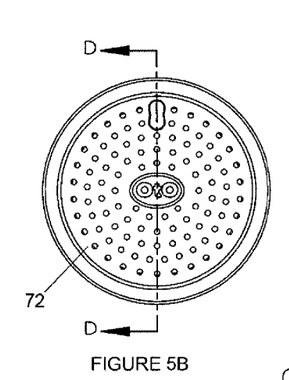
FIG. 5B is an end view of the speaker.
Figure 5C:
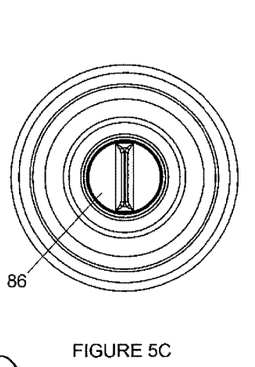
FIG. 5C is the other end view of the speaker housing

An alternative embodiment of the speaker housing 70 is shown in FIGS. 5, 5A, 5B, and 5C. FIG. 5A shows details of the Blue tooth waterproof rechargeable speaker having the lithium battery 84, and the speaker grill is shown in FIG. 5B, and the end cap 86 shown in FIG. 5C.

Figures 6, 7, 7A, 7B:
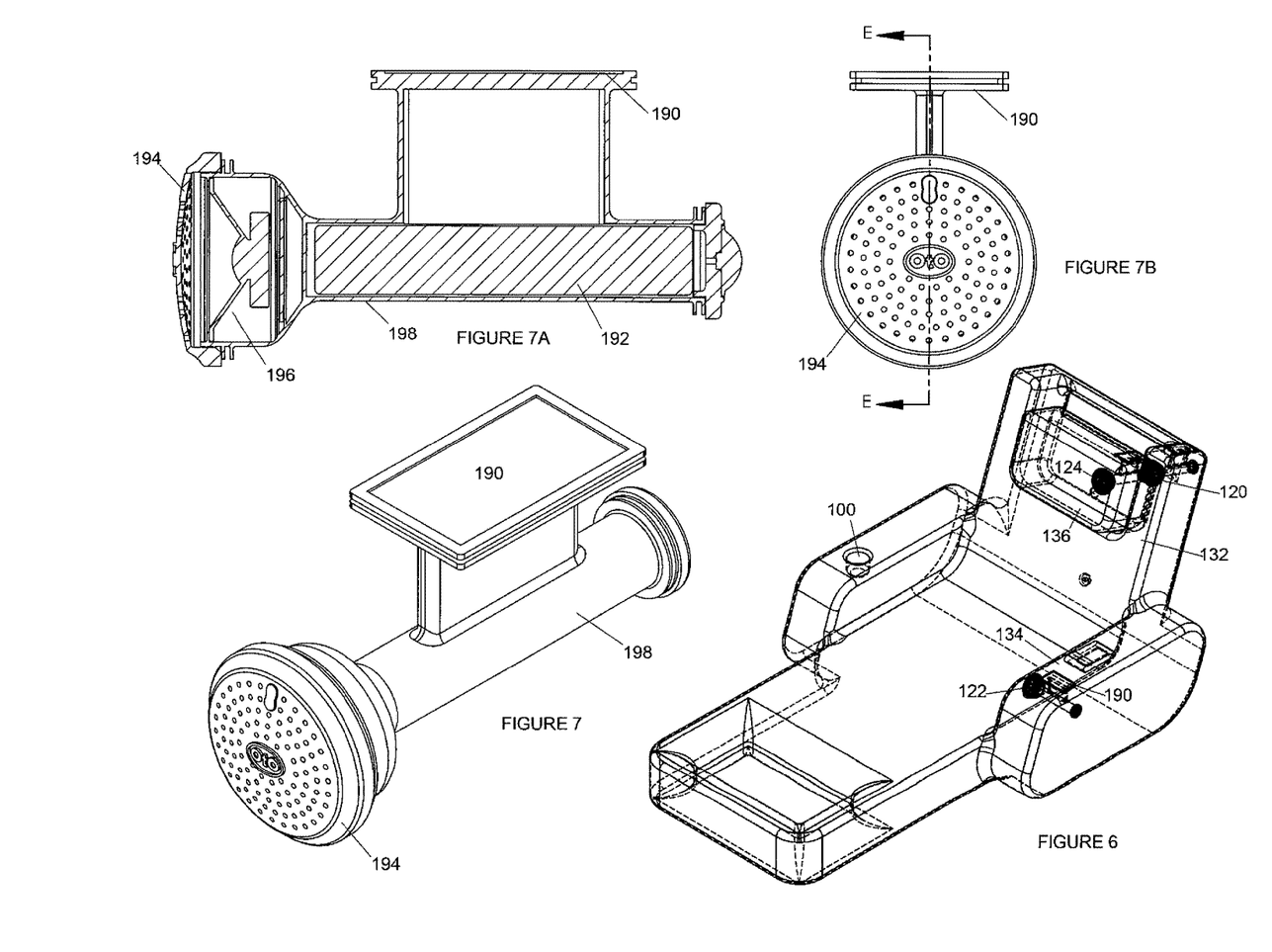
FIG. 6 is a perspective view of an alternative embodiment of the pool float.
FIG. 7 is a perspective view of the built-in speaker having a solar power source.
FIG. 7A is a sectional view of the built-in speaker showing the solar power source.
FIG. 7B is an end view of the speaker.

FIG. 6 is a perspective view of an alternative embodiment of the pool float 100 also having speakers in the headrest 132, the armrest 134, and the removable pillow 136. FIG. 6 shows further details of the floatation body 100 showing the location of the solar panel 190 in the armrest 134. FIGS. 7, 7A, and 7B show another embodiment of the speaker 196, which is powered by a solar panel 190, and includes a battery 192 powered by the solar panel 190. The speaker grill is shown at 194 and the speaker is shown at 196. The battery housing is shown at 198.

Figures 8, 8B, 8E, 8F:
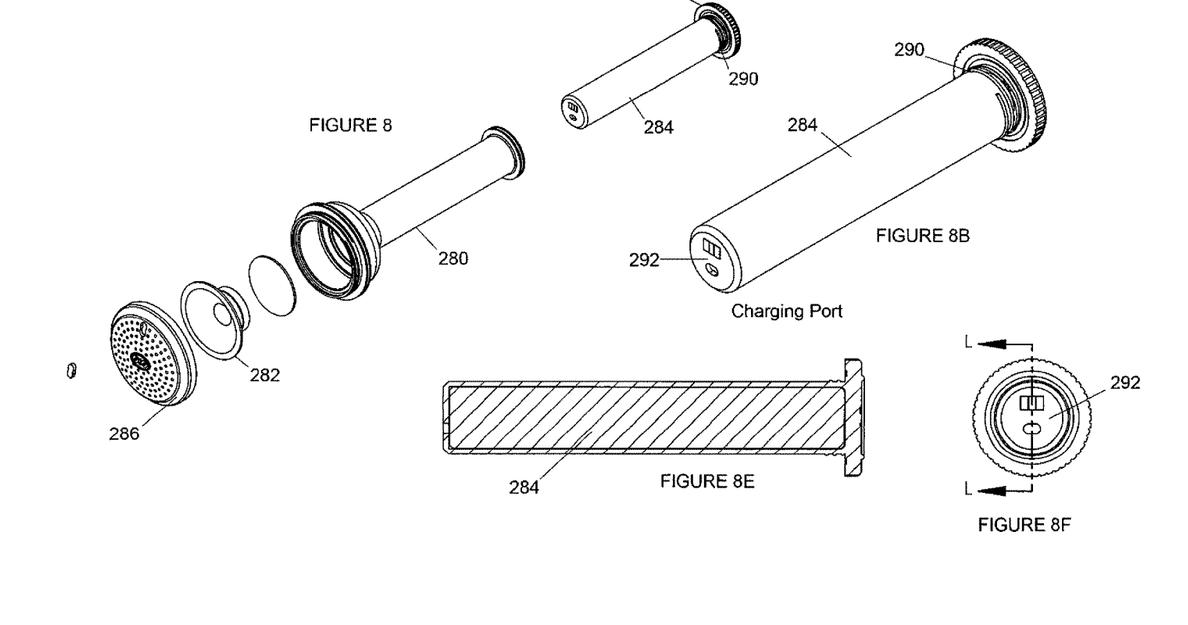
FIG. 8 is an exploded perspective view showing another embodiment having a removable threaded housing for inserting a chargeable lithium ion battery into the speaker housing.
FIG. 8B is a detailed perspective view of the removable threaded housing showing the threads on the right end thereof for unscrewing the removable housing from the battery housing.
FIG. 8E is a cross-sectional view of the battery.
FIG. 8F is an end view thereof.
Figure 8A:
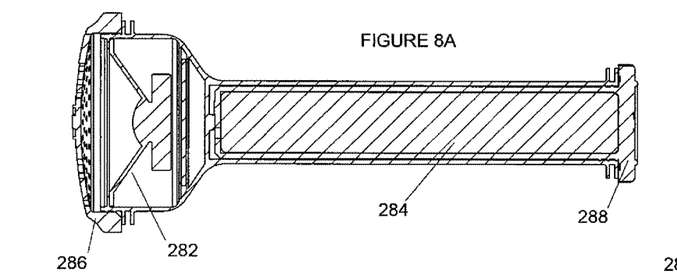
FIG. 8A is a cross-sectional view of the removable threaded battery housing.
Figure 8C:
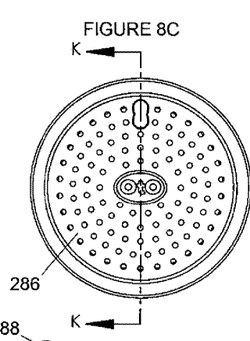
FIG. 8C shows an end view of the speaker.
Figure 8D:
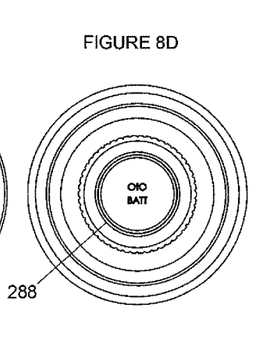
FIG. 8D shows the other end view of the housing.

FIGS. 8, 8A, 8B, 8C and 8D show an alternative embodiment having a housing 280, a rechargeable lithium battery 284, a speaker 282, a speaker grill 286, and an end cap 288. The battery 284 is connected to end cap 288 having threads 290 for securing the battery 284 into the speaker housing 280. Also, as shown in FIG. 8B, the left end of the battery 284 has a charging port 292 for charging the battery 284 when it is removed from the housing 280, as shown more clearly in FIG. 8F. FIG. 8E shows a cross-sectional view of the battery 284.

Figures 9, 9A:
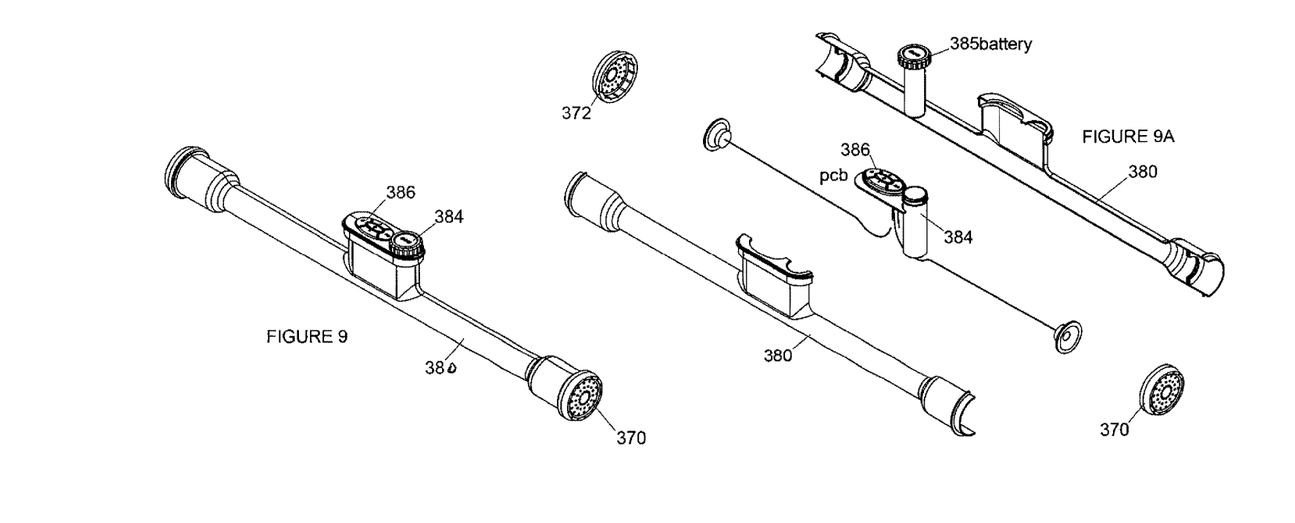
FIG. 9 is a is perspective view of an alternative embodiment showing a speaker housing having two end speakers.
FIG. 9A is an exploded perspective view thereof showing the internal battery and PCB board for controlling the operation.
Figure 9B:
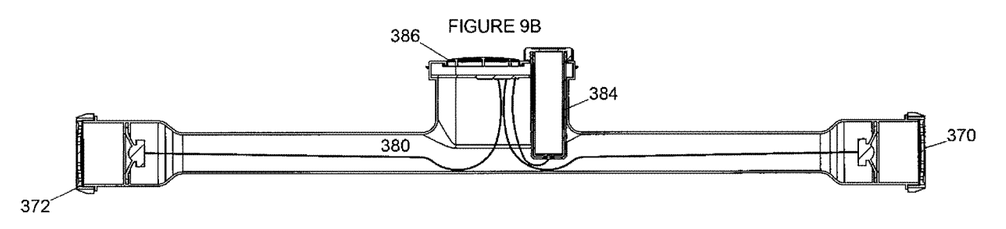
FIG. 9B is a side view thereof.
Figure 9C:
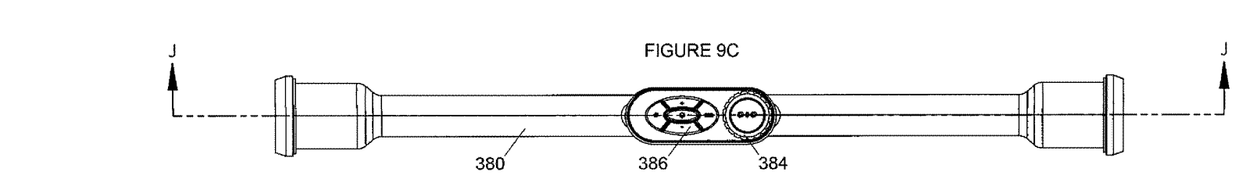
FIG. 9C is a top view thereof.

FIGS. 9, 9A, 9B, and 9C show an alternative embodiment having a housing 380 for receiving rechargeable lithium battery 384 and a PCB board 386. In addition, this embodiment includes two end speakers 370 and 372 in the same housing 380, and the battery housing 385 is used to power both speakers. Also, the PCB board 386 is used to control the operation of the speakers 370 and 372. In addition, the float 12 uses a wireless Bluetooth connection from an external smart device to provide sound to the speakers 370 and 372. Further, the two speakers 370 and 372 shown in FIG. 9A are hard wired to the PCB board 386 and battery 385, and receive sound via a Bluetooth signal from the external smart device.

It should be understood that the present invention also provides an alternative flotation device similar to flotation device 10 that also floats on water, but is has a foam body for flotation, instead of being inflatable. In this embodiment, the flotation body is filled with foam, instead of air. In addition, multiple speaker units are located in the headrest, or armrest, or in a removable pillow, similar to the first embodiment. Further, in this alternative embodiment, the power source may be either batteries or a solar panel. In addition, the batteries are rechargeable and the speaker units are connected to the batteries as a power source. Alternatively, the speaker units may be solar powered using a solar cell.

The present invention provides an ergonomic pool float with an integrated and waterproof Blue Tooth speaker system, which is powered by removable and rechargeable batteries, including a lithium ion battery, which has up to 20 hours of power after a full charge. In addition, the Blue Tooth speaker is either a 4.0 or a 4.1 low energy BLE having a range of 70 to 80 feet. Also, the speaker has been tested to IPX 6/7 waterproofing and weatherproofing, and is not effected by sand or snow. Further, the speakers are at least 3 watts to 10 watts with performance drivers to improve sound quality. Also, the cell phone has hands-free calling, and there is an external control pad having an on/off switch, and a control for pairing and for volume. Further, the present invention may include a built-in air pump, as another feature of the invention.

Advantages of the Present Invention

An advantage of the present invention is to provide an improved flotation device, which includes convenience structure for the user, including one or more built-in speakers.

Another advantage of the present invention is to provide an improved flotation device, which includes convenience structure for the user, including a headrest, or an armrest, or a removable pillow, having one or more built-in speakers contained therein.

Another advantage of the present invention is to provide an improved flotation device, which includes convenience structure for the user, wherein the built-in speakers are powered by solar power, instead of batteries.

Another advantage of the present invention is to provide an improved flotation device, which includes convenience structure for the user, wherein the flotation device includes foam for flotation, instead of being an inflatable body.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An inflatable device that floats on water, said device comprising:
   a) an inflatable body having an interior for flotation;
   b) one or more speaker units is secured in one or more compartments formed in the body, wherein said speaker units may be in a headrest, or in an armrest, or in a removable pillow;
   c) a power source is secured in a compartment in said body, wherein said power source may be one or more batteries or a solar panel; and
   d) wherein each of said speakers 20 include a housing 70, a battery 74, a speaker unit 78, an end cap 76, and a housing back 80.

2. An inflatable device in accordance with claim 1, wherein said power source is a rechargeable and removable lithium battery, and a further compartment is provided for receiving a cell phone therein.

3. An inflatable device in accordance with claim 1, wherein said inflatable body is in the form of a chair, a lounge, or a double lounge.

4. An inflatable device in accordance with claim 1, wherein said power source is a solar panel and one or more batteries mounted in a battery housing, wherein said solar panel is mounted on said battery housing on the exterior of said battery housing, and said battery is rechargeable and removable.

5. An inflatable device in accordance with claim 1, wherein batteries are mounted in a battery housing having an end cap for removing said battery housing to provide a water tight seal, and wherein said battery includes a charging port for recharging said battery.

6. An inflatable device in accordance with claim 1, wherein batteries are mounted in a battery housing having two separate speakers on the ends of said battery housing, wherein said speakers are powered by a rechargeable battery mounted in said battery housing, and wherein a control panel is provided on said housing to control the operation of said speakers.

7. An inflatable device in accordance with claim 1, wherein said inflatable body has a wireless connection for connecting to an external device to provide sound to said speakers.

8. An inflatable device in accordance with claim 1, wherein said speakers are waterproof, weatherproof, and have a sound range of over 50 feet, and wherein said speakers have a power of at least 3 watts to 10 watts.

9. A water flotation device that floats on water, said device comprising:
   a) a body having an interior for flotation, wherein said body includes foam for flotation;
   b) one or more speaker units is secured in one or more compartments formed in said body, wherein said speaker units may be in the headrest, or in an armrest, or in a removable pillow;
   c) a power source is secured in a compartment in said body, wherein said power source may be one or more batteries or a solar panel; and
   d) wherein each of said speakers 20 include a housing 70, a battery 74, a speaker unit 78, an end cap 76, and a housing back 80.

10. A water flotation device in accordance with claim 9, wherein said power source is a rechargeable and removable lithium battery, and a further compartment is provided for receiving a cell phone therein.

11. A water flotation device in accordance with claim 9, wherein said flotation body is in the form of a chair, a lounge, or a double lounge.

12. A water flotation device in accordance with claim 9, wherein said power source is a solar panel and one or more batteries mounted in a battery housing, wherein said solar panel is mounted on said battery housing on the exterior of said battery housing, and said battery is rechargeable and removable.

13. A water flotation device in accordance with claim 9, wherein said battery housing has an end cap for removing said battery housing to provide a water tight seal, and wherein said battery includes a charging port for recharging said battery.

14. A water flotation device in accordance with claim 9, wherein said battery housing includes two separate speakers on the ends of the housing, wherein said speakers are powered by a rechargeable battery mounted in said battery housing, and wherein a control panel is provided on said housing to control the operation of said speakers.

15. A water flotation device in accordance with claim 9, wherein said speakers are waterproof weatherproof, and have a sound range of over 50 feet, and wherein said speakers have a power of from at least 3 watts to 10 watts.

* * * * *